J. F. JOHNSON.
VEHICLE-AXLE.

No. 175,999.          Patented April 11, 1876.

Witnesses.           Inventor.
L. H. Latimer.       James F Johnson
W. J. Pratt.         per Crosby & Gregory
                              Attys

UNITED STATES PATENT OFFICE.

JAMES F. JOHNSON, OF BOSTON, MASSACHUSETTS, ASSIGNOR TO HIMSELF AND A. AUGUSTUS RICHARDSON, OF SAME PLACE.

IMPROVEMENT IN VEHICLE-AXLES.

Specification forming part of Letters Patent No. 175,999, dated April 11, 1876; application filed March 10, 1876.

*To all whom it may concern:*

Be it known that I, JAMES F. JOHNSON, of Boston, in the county of Suffolk and State of Massachusetts, have invented an Improvement in Carriage-Axles, of which the following is a specification:

This invention relates to improvements in carriage-axles wherein the axle-box and hub are permitted to move a short distance laterally with relation to the axle, springs at each end of the axle-box controlling the extent of lateral movement, and serving as a packing; and the invention consists in an axle provided with a collar and a nut, in combination with an axle-box and springs at and surrounding each end of the box, and held in position thereon by means of the collar and axle-nut, all substantially as described.

In other axles of this class springs have been placed between the axle-arm and box, thereby shortening the length of the bearing-surface of the box on the axle-arm, resulting in wearing the axle-arm centrally between its end and collar, and the end of the box enlarged to receive the springs has made it necessary, to insert the axle-box into the hub, to make a hole as large, at least, as the portion of the box inclosing the springs.

With this my improvement the bearing-surface of the box is extended over almost the whole length of the bearing portion of the axle-arm, and the box adapted to receive the springs about its ends may be made of less diameter than when the box incloses the spring, and consequently a hub of less diameter may be used, which is a great desideratum.

Figure 1:
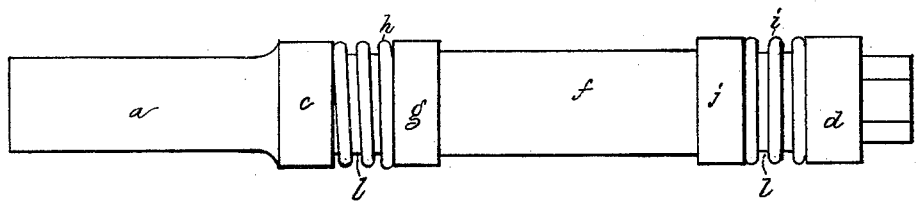
Figure 2:
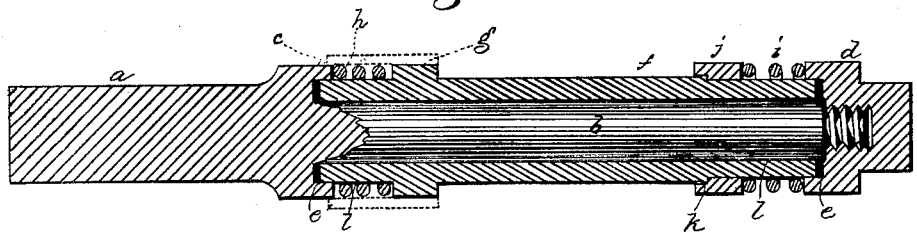

Figure 1 shows my invention in plan, and Fig. 2 in longitudinal section.

The axle *a* has an arm, *b*, and a collar, *c*, either solid or welded, and at its outer end a screw-thread to receive a nut, *d*, the latter and the collar being preferably recessed at *e e'* to receive the ends of the box *f*. The box is provided at its rear end with a shoulder, *g*, between which and the end of the collar *c* is placed the spring *h*, and the spring *i* is placed between the removable holder *j* and the end of the nut *d*. This removable holder is shown as a ring fitted to a reduced portion of the forward end of the box, and in this instance the holder rests against a shoulder, *k*, on the outer portion of the box. The ends *l l* of the box, outside the parts *g j*, fit the axle-arm, and about these ends are placed the springs *h i;* whereas, as heretofore made, these springs have only surrounded the axle-arm, and have been placed between the arm and the box, thereby lessening the length of the bearing-surface of the box.

To insert this box into a hub, the hub is bored to fit the box at its central part, and at the ends of the hub the hole is enlarged to receive the shoulder *g* and holder *j*, the holder *j* being placed in position on the box after the box is driven into the hub.

In the usual box containing the springs within it, besides decreasing the bearing-surface, the enlargement of the ends of the box necessitates boring a hole entirely through the hub as large, at least, as the enlarged ends of the box, and the hub is thereby weakened, and the result is a hub is required of greater diameter than when the box and springs are arranged as described by me.

The ends of the box do not touch the collar and nut, and the usual leather or other packing-washers, which wear rapidly, are not required, the springs serving as packing, and also permitting the hub and wheel to move a little and yield to a blow against a stone or other impediment, and not jar the whole vehicle, as in an axle wherein the box ends bear against the collar and nut.

The recesses *e e'* prevent sand and dirt from getting between the bearing-surfaces. A hub should have as small a hole as possible bored at its center, so as not to interfere with the wood holding the spokes.

The shoulder *g* might also be made loose and detachable as holder *j;* and, if desired, the shoulder *g* or holder *j* may be provided with a tubular extension, to surround the spring resting against it, and this construction would prevent the oil escaping from the box entering the pores of the wood forming the hub. This tubular extension is shown in dotted lines, Fig. 2, as applied to shoulder $g$.

I claim—

1. The combination of the axle and box and external shoulder and holder with the springs placed about the ends of the box, and with relation to the box and collar and nut, substantially as described.

2. The axle and the recessed collar and nut, in combination with the box adapted to extend its ends into the recesses $e$ $e'$, and with the springs arranged about the ends of the box, substantially as described.

3. The removable spring-holder and spring, in combination with, and adapted to surround, the end of the box, as set forth.

In testimony whereof I have signed my name to this specification in the presence of two subscribing witnesses.

JAMES F. JOHNSON.

Witnesses:
 G. W. GREGORY,
 S. B. KIDDER.